United States Patent
Kalkhoff

(10) Patent No.: US 7,878,391 B2
(45) Date of Patent: Feb. 1, 2011

(54) EGG COUNTING DEVICE AND METHOD

(75) Inventor: Christian Kalkhoff, Vechta (DE)

(73) Assignee: Big Dutchman International GmbH (DE)

( * ) Notice: Subject to any disclaimer, the term of this patent is extended or adjusted under 35 U.S.C. 154(b) by 816 days.

(21) Appl. No.: 11/803,325

(22) Filed: May 14, 2007

(65) Prior Publication Data

US 2007/0278284 A1    Dec. 6, 2007

(30) Foreign Application Priority Data

May 15, 2006    (DE) .................... 20 2006 007 875 U

(51) Int. Cl.
*G06M 1/10* (2006.01)
(52) U.S. Cl. ...................... 235/98 C; 356/54
(58) Field of Classification Search .............. 235/98 C; 356/54, 445; 377/6; 209/511
See application file for complete search history.

(56) References Cited

U.S. PATENT DOCUMENTS

| | | |
|---|---|---|
| 4,253,120 A | 2/1981 | Levine |
| 4,675,520 A | 6/1987 | Harrsen et al. |
| 4,868,901 A | 9/1989 | Kniskern et al. |
| 5,311,977 A | 5/1994 | Dean et al. |
| 7,573,567 B2 * | 8/2009 | Hershtik ............... 356/54 |
| 2005/0063513 A1 | 3/2005 | Hsieh et al. |
| 2006/0039583 A1 | 2/2006 | Bickert et al. |

FOREIGN PATENT DOCUMENTS

| | | |
|---|---|---|
| DE | 34 19 883 A1 | 11/1985 |
| DE | 43 05 559 A1 | 8/1994 |
| DE | 196 07 258 A1 | 8/1997 |
| DE | 197 07 155 A1 | 8/1997 |
| DE | 203 15 118 U1 | 3/2004 |
| DE | 102 55 072 A1 | 6/2004 |
| GB | 2 226 130 A | 6/1990 |
| JP | 2000-235005 | 8/2000 |
| JP | 2001-27612 | 1/2001 |
| JP | 2003-346124 | 12/2003 |
| RU | 2129303 C1 | 4/1999 |
| SU | 1483470 A1 | 5/1989 |
| WO | WO 97/43733 | 11/1997 |
| WO | WO 2004/004319 A1 | 1/2004 |

OTHER PUBLICATIONS

Russian Patent Office, "English Language Translation of Russian Office Action issued in Russian Patent Application No. 2007117866, filed May 14, 2007," (4 pgs.), (2008).

* cited by examiner

*Primary Examiner*—Karl D Frech
(74) *Attorney, Agent, or Firm*—Price, Heneveld, Cooper, DeWitt & Litton, LLP

(57) ABSTRACT

A device and related method for counting objects, such as eggs or the like includes a plurality of first detectors, each of which has a locally delimited detection area, which can detect electromagnetic radiation, in particular light in the visible or infrared range, from the detection area, and which are arranged next to one another in a first line. An evaluation unit is coupled to the first detectors and is designed or configured to process the signals of the detectors and on the basis of the signals, to establish the presence of an object in the detection area.

25 Claims, 2 Drawing Sheets

EGG COUNTING DEVICE AND METHOD

CLAIM OF PRIORITY

Applicant hereby claims the priority benefits under the provisions of 35 U.S.C. §119, basing said claim of priority on German Patent Application 20 2006 007 875.4, filed May 15, 2006. In accordance with the provisions of 35 U.S.C. §119 and Rule 55(b), a certified copy of the above-listed German patent application will be filed before the grant of a patent.

BACKGROUND OF THE INVENTION

The present invention relates to a device and associated method for counting objects, such as eggs or the like.

Counting objects is necessary in a large number of application areas, for example for controlling production sequences or conveyor processes. The purpose of counting devices or counting methods is to establish the number of individual products that have been produced or are present in a specific time period, in a specific surface area and/or by a specific number of productive units. For this purpose, the products are either guided past a stationary counting device, for example a conveying device, or the counting device is moved along the products.

Typically devices of this kind for counting objects are used for counting eggs inside or outside a coop for egg-laying poultry. In this application, counting is necessary to monitor and control the discharge of laid eggs from the laying area or from collection points arranged after the laying area, and the number of laid eggs, particularly if broken down according to animals, coop units, coop rows or other combined units, provides information about the laying output and can give an indication of any irregularities, such as for example illness.

From U.S. Pat. No. 4,868,901 a counting device is known which consists of multiple emitter/detector pairs arranged in a row next to one another. The row extends transversely across a conveyor belt on which the eggs are moved past the counting device. Due to the different reflection properties of the conveyor belt surface and the surface of an egg placed thereon, such known counting devices can identify the presence of an egg in the area of one of the detectors. Several measurements made at discrete time intervals make it possible to associate the surface section determined by the detectors at different times with a single egg, and in this way establish that an egg has passed under the counting device. In this way, by means of the corresponding, consecutive increase and decrease in the number of detectors registering the egg surface, it can be assumed that an egg has passed through, and the egg can be counted.

A problem with conveying objects, particularly round objects, such as eggs, is that the latter can move independently when the conveying device accelerates. For example, the eggs can roll in the opposite direction to the conveying direction. Particularly if the conveying device is stopped and started often due to control procedures or the like, round objects can also move through the counting device in the opposite direction to the conveying direction. However, the known counting devices are not in a position to differentiate between objects moving in the conveying direction or opposite the conveying direction, so that when there are movements in the wrong direction a counting error occurs.

Therefore, there is a need for a counting device which produces a more reliable counting result, particularly when the objects move temporarily in a direction opposite to the conveying direction.

The requirements for the control of production processes are increasing continually, particularly in areas where animals are involved in production, the requirements for the control of production processes are increased for safety of the animals. Therefore, not only is there a need for a counting device which reliably counts the products, but also for a counting device which collects further data in addition to the actual counting process, thereby making it possible to analyze or draw conclusions about the production process and any disruptions to production, such as for example any illness of the animals. A counting device or a device for counting is therefore defined in this description and the claims as a device which is suitable for counting objects, but can also be designed to acquire additional data as well. In the same way, a counting method or method for counting is defined as a method that counts objects on the one hand, but on the other hand can also be designed to establish other data in addition to counting objects.

SUMMARY OF THE INVENTION

In one aspect of the present invention, the requirements described above are satisfied by a counting device of the aforementioned kind, which also includes a number of second detectors, each of which has a locally defined detection area which can detect electromagnetic radiation, in particular light in the visible or infrared range, from the detection area and which are arranged next to one another in a second line adjacent to and parallel to the first line, wherein the evaluation device is coupled to the second detectors and is designed to process the signals of the second detectors, and based on the signal of each detector to establish the presence of an object in the detection area of the second detector.

In one aspect of the present invention, it is possible to establish the movement direction of an object relative to the counting device in a simple and reliable way. For this purpose, the present counting device provides at least one additional row of detectors, which are arranged so that an object to be counted passes through the detection area of the first and second line of detectors with regular relative movement or conveying. The present counting device makes it possible with detection occurring at discrete time intervals with the first and second line for an object to be identified and its outline to be recognized at least partly, and by comparing at least two detections performed at different time intervals, the direction of movement of the object is clearly established. The present counting device is therefore able to count objects reliably, even if the latter move temporarily opposite the actual direction of movement between the counting device and the objects, in that the object cannot only be detected and identified, but the direction of movement of the object can also be established.

In one aspect of the present invention, a detector is defined as any type of sensor which is able to detect the presence of an object in a delimited detection area. In particular, contact-free detectors are suitable for this, such as for example radiation receivers which operate in the visible or infrared light range. The detectors can if necessary operate together with corresponding emitter devices, such as for example light emitters or the like, in order to permit a time-restricted illumination of the detection area, but can also operate with environmental light or other available radiation or measurable properties of the object to be counted.

The first and second detectors may be arranged next to one another in a first or second line. In this case, it is neither necessary for the detectors to be arranged at equal distances from one another nor for the detectors to be aligned precisely linearly or exactly perpendicular to the relative movement direction between the counting device and the objects. Instead of this, it is sufficient for the execution of the invention if the detectors extend at right angles or obliquely relative to the movement direction in rows linearly or offset relative to one another in order to cover the area through which the objects to be counted must pass.

In one aspect of the present invention, the evaluation unit can be arranged directly on the counting device or spaced apart from the latter. The evaluation unit can be divided into several individual evaluation units or can be in the form of a single logical circuit. In a first advantageous embodiment, the evaluation device is designed to determine by comparison of the detector signals of adjacent first detectors and adjacent second detectors at least one section of the contour of the object perpendicular to the detection direction. The identification of the contour, at least in sections, makes it possible to identify objects in a particularly reliable manner at a low data processing cost. The contour is typically two-dimensional and can be established as a section by a single data acquisition of the first and second detectors, or as a larger section or completely, by multiple, time-staggered data acquisitions of the first and/or second detectors, if there is a relative movement between the detectors and the object. A point on the contour line of the object can hereby be determined as the point at which a significant change has been established between two detector signals of spaced apart detectors or time-staggered detector signals. Typically, the two detectors scanning adjacent to the contour line show significantly different detector signals, and detectors lying adjacent to said respective detectors show similar detector signals to the latter, so that a contour line can be established between the two first detectors. As the contour line is typically a continuous line, a single contour line can be calculated by interpolation and logical data processing from the points on the contour line established at discrete intervals. This can also be achieved typically in the evaluation device.

In one aspect of the present invention, it is particularly advantageous if the evaluation unit is designed or configured to establish the movement direction of the object relative to the detectors by comparing two time-staggered sections of the contour of the object. The determination of the contour line makes it possible in principle to determine not only the presence of an object in the detection area of the detectors but also its position relative to the detectors. By comparing two time-staggered contours or contour sections, a displacement of the position of the object relative to the detectors can be established, and thus the direction of movement of the object can be established. This makes it possible to detect a regular movement direction in the desired conveying direction or an irregular movement direction opposite the conveying direction, for example the rolling of the object. In addition to the movement direction itself, the movement speed can also be established in that the path of the object covered in the time interval between the two measurements is differentiated over the time interval.

In one aspect of the present invention, it is also preferable if a specific number of first and second detectors are arranged in a first or second line and an interface is provided to couple the device with a different device with first and second detectors, so that the first and second lines of the two devices are arranged in extension of one another. Counting devices of the aforementioned kind are often used to count objects which move over different widths, for example various conveyor belt widths. Counting devices according to the prior art have a predefined width, and the objects are moved together according to this width for counting purposes, often by guiding devices or the like, in order to prevent objects from passing the sides of the counting device outside the counting area. This process of pushing the objects together can however result in mechanical damage to the objects. The development according to one aspect of the invention makes it possible for the counting device to extend over any width in that several individual counting devices are coupled together to form a sufficiently long counting device which can extend transversely over a counting area of any width. In this way, a modular adjustment of the counting device to manufacturing or conveying engineering conditions, such as in particular the width of the conveyor belt, is made possible, and the objects can be counted in a careful manner.

In one aspect of the present invention, it is also preferable for the detectors to be designed or configured to detect in the infrared wave range and for at least one infrared radiation source to be provided for illuminating the detection areas. Particularly in areas where daylight provides the illumination, it is advantageous to use a different wavelength for detection. The infrared wave range is particularly suitable for this. It is also important that the wavelength used for the measurement not attract pests in many applications, which is also why infrared light is particularly suitable. Detection in the infrared wave range makes it possible, by means of a specific and time-limited infrared illumination of the detection area, to carry out measurements in a defined manner at spaced time intervals. In particular, individual detection areas can also be illuminated one after the other to prevent falsification of the measuring signals of adjacent detection areas.

In one aspect of the present invention, it is also preferable if the device according to the invention is developed further by designing the evaluation device to determine at least one section of the contour of the object perpendicular to the direction of detection by comparing the detector signals of adjacent first detectors and adjacent second detectors, to determine a direction of movement of the object relative to the detectors by comparing two sections determined at time intervals of the contour of the object, and also to determine whether a new object has entered into the detection area, and that the evaluation device comprises a counting device which is designed to increase a counter by one when a new object has moved in the input direction into the detection area of the detectors and has been identified. The counter can be in the form for example of a digital storage device with a correspondingly adjusted logical circuit. The input direction is in particular the regular direction of movement between the counting device and the objects to be counted, i.e., for example the conveying direction of a conveying device moving the objects. The identification of an object is understood here to mean that the object has been identified by its contour or a section thereof.

In one aspect of the present invention, it is particularly important in this connection to check whether the detected object has already been counted or has not yet been counted, i.e., is a new object. This can be achieved preferably in that counted objects are marked, for example they are stored in a memory, and newly detected objects are compared with the stored objects or (alternatively or additionally) the arrangement of the objects relative to the counting device is compared at two detection times in order to determine whether it is an identical, i.e., already counted, or a different, i.e., new object.

In one aspect of the present invention, it is particularly preferable if the counting device is designed or configured to reduce the counter by one if an already counted object, which has moved into the detection area of the detectors and has already been identified, moves in the opposite direction to its original input direction out of the detection area. In this way, a reliable counting result is ensured even if undesirable, irregular movements of the objects occur, for example objects rolling in the opposite direction to the conveying direction. In this way, the counter can be reduced when an object enters the detection area in the opposite direction to the normal direction and leaves the latter in the opposite direction to the normal direction, and when an object enters in the usual direction of movement and then leaves the detection area in the opposite direction to the normal direction of movement.

In the above-noted case, the two embodiments can be varied as desired in that other defined counting points are determined, for example significant cross-sectional changes of the objects to be counted, significant color changes or contrast changes of the objects.

In one aspect of the present invention, it is also preferred that the evaluation device is designed or configured to evaluate several objects registered in the detection areas of the detectors at the same time. At specific widths of the detected counting area and in particular when counting on conveying devices with a high conveyor quota, it is not practical to arrange the objects to be counted individually behind one another for counting purposes, but the objects must pass the counting device in twos or multiples arranged next to one another. In this case, it is advantageous if the evaluation device can also evaluate several products simultaneously, i.e., can differentiate adjacent objects in the detection area simultaneously. In this way, the evaluation device can be developed logically so that, even when the contour lines are in contact or the contour lines overlap, the two or more touching or overlapping objects can be differentiated and counted.

In one aspect of the present invention, it is particularly advantageous that the device is extended by a memory device in which at least one contour, and preferably several known contours of one or more objects are stored, and by a comparison device, comparing the contour of an object detected by the detectors with the stored contour(s) and identifying the object. This development also provides a series of additional functions. Thus by means of this development, there can be a very marked difference between the objects to be counted and other structures passing through the detection area. This is advantageous for example if the objects are conveyed on structured conveyor belts, such as holed, slit or otherwise perforated conveyor belts or conveyor belts with ribs, nipples or the like, and it is necessary to differentiate between the perforations or other structures of the conveyor belt and the objects.

This above-noted development also makes it possible to check the quality of the objects to be counted, in that objects within the geometrically normal range are counted, and objects outside this range, i.e., do not fit the contours in the memory, are not counted or are counted in a corresponding separate error memory, and if necessary, a signal is output to display a faulty product. Typically this function is used when counting hens' eggs to identify non-starters, i.e., eggs without a shell, which are typically characterized by having a contour that is a flattened shape and typically broadened with respect to the width and can be identified in this way. The stored contours take into account all the possible variations of the objects including all of the typically occurring variations in contour, and they also include the contour produced when the products are in a mounted position, an oblique position, a skewed position or the like. Thus a hen's egg can for example have a round shape in one position which differs from the otherwise oval shape but still needs to be identified.

In general and particularly for the aforementioned purpose, it is advantageous if the device is developed further in that the first and/or second detectors are designed to establish brightness intensity and/or a color value from the detection area. Particularly if the objects to be counted have a curved surface by having different reflection directions with one-sided or multi-sided illumination, there is a different distribution of the brightness detected by the detector over the detected object surface. These differences in the brightness intensity of individual surface sections of the object to be counted can be used to identify the object particularly precisely. In the same way, color values from the surface areas of the object can be used to accurately identify the objects. In this way it is also possible for example to distinguish an egg presenting with a round contour from a hole in the conveyor belt, as the distribution of the brightness intensity in the detected surface section of the egg differs from that of the conveyor belt hole.

In the above-noted case, it is particularly preferable if the evaluation device is designed to identify by way of the brightness intensity and/or the color value a surface feature of the object, in particular the degree of soiling. In this way, objects can be differentiated more precisely and accordingly several differentiating counters can be incremented to obtain more precise results about the counted objects. In particular, this development is suitable for determining disruptions to production, for example unusually high levels of soiling on the product, which show that cleaning is required in a specific area. In combination with the color value, this also permits a differentiated assessment of the degree of soiling, for example in the case of egg counting can also enable blood residue to be detected on the eggs in order to spot injuries to animals rapidly and then start a suitable treatment. Here too a separate error memory can be provided for specific detection results deviating from the norm, and alternatively or additionally a warning signal can be triggered to display the detection result deviating from the norm.

In the above-noted case, it is preferred in particular if the device is extended to comprise a storage device in which at least one and preferably several known threshold values or distributions in the brightness intensity and/or the color values are stored within the contour of the object, and by means of a comparison device, comparing a local or average value determined by the detectors or a distribution of the brightness intensity and/or the color value of an object with the stored threshold values or distribution of the brightness intensity and/or color value, thus identifying the object on exceeding and/or falling below a threshold or one that coincides with the stored and detected distribution pattern. This development operates in the same way as the previously described development for comparing the detected contours with the stored contours, and in a corresponding manner, enables the adjustment of a detected distribution of the brightness intensity or color value distribution to permit differentiated product classifications and product error identifications.

In one aspect of the invention, the device according to the invention can also be extended by a self-diagnosis and correction device which is designed to identify a fault in an individual detector and causes the evaluation device not to consider the measurement values of such a detector. A self-diagnosing and correcting device can for example classify detectors as faulty which have output the same value over a specific time period even though adjacent detectors show different values and can remove them from the evaluation of the detection results, in order to avoid contour error detection by faulty detectors. The broken down detector is then preferably replaced by a detector adjacent to the latter.

In the above-noted case, it is practical if the self-diagnosis and correction device is designed to output a warning signal if a prespecified number of faulty detectors is exceeded. Typically the failure of individual detectors can be compensated for by the counting device, and a reliable counter result can still be guaranteed. However, with a specific number of faulty detectors, the counter result will no longer necessarily coincide with the number of objects that have actually passed through, as it is no longer possible to compensate for the faulty detectors. In this case, it is practical to output a warning signal so that the fault can be corrected, for example the detectors may need to be cleaned.

In one aspect of the present invention, the device according to the invention can be developed further in that the evaluation device is designed to calculate the volume and/or weight of the object by way of the detected contours of an object and by way of known stored reference values and to output the values or store them in a memory device. The contour established by the detectors makes it possible to distinguish and classify objects which present with different sizes or geometry types. In this case, the detected contour, volume and weight of the object can be established, in that the detected surface established from the contour line is processed with reference values which represent a ratio to the typical volume or weight of the object by way of the detected contour line. The values established in this way are preferably stored in separate memory units of a memory device. In this way, for example when counting hens' eggs, it is possible to arrange classifications according to different weight classes, and simplified production planning and control can be permitted.

Lastly, in one aspect of the present invention, the device can be developed further by providing a plurality of detector lines. This permits a high resolution analysis of the contour, color distribution and brightness intensity of the objects to be counted. Ideally this embodiment can be designed so that a digital image detector is used with a multiple line optical sensor, for example a CCD sensor, and in this way, a plurality of lines with a plurality of detectors can be provided. This is possible for example in that the counting device according to the invention is designed to have a corresponding digital video camera. This embodiment also makes it possible to detect the entire contour line of an object in a single data detection, to identify the object by way of said contour line and thus to count it rapidly and reliably. Furthermore, it is possible with this embodiment to detect the color and brightness intensity distributions inside and outside the contour of the object in a differentiated and high resolution manner.

A further aspect of the invention is a demand-controlled conveying device for objects, in particular eggs, comprising a conveying device for conveying the objects, a counting device according to one of the preceding claims which is arranged so that it counts the objects supplied to the conveying device, and a control which is designed to convey the objects through the conveying device when a prespecified number of objects has been counted by the counting device.

The conveying device makes it possible, in particular in areas in which there is discontinuous production or discontinuous input of products into a conveying device, to control the conveying device as required, i.e., operate the conveying device only when a specific amount of the product has been supplied to the conveying device, which is to be conveyed if necessary for a limited time period.

A further aspect of the invention is a device for conveying and counting and/or monitoring the quality of eggs, comprising a driven endless conveyor belt for conveying the eggs, a counting device according to one of the preceding claims, comprising several detector lines with a plurality of detectors for determining the contour and the distribution of the brightness intensity and/or the color value of each egg which is arranged so that it counts and analyses the eggs conveyed on the conveyor belt, and an interface for outputting and/or a storage device for storing the number of conveyed eggs in several previously determined weight classes. The conveyor belt designed in this way is particularly suitable for controlling the sequence of production in production areas arranged ahead of the conveying device.

A further aspect of the invention is a method for counting objects. For the advantages, variants and details of the execution of the method and its developments refer to the corresponding aspects of the device and its developments described above, which have been developed specially and are suitable for performing the corresponding method.

These and other advantages of the invention will be further understood and appreciated by those skilled in the art by reference to the following written specification, claims and appended drawings.

BRIEF DESCRIPTION OF THE DRAWINGS

A preferred embodiment of the invention is described with reference to the enclosed figures.

DETAILED DESCRIPTION OF THE PREFERRED EMBODIMENTS

Figure 1:
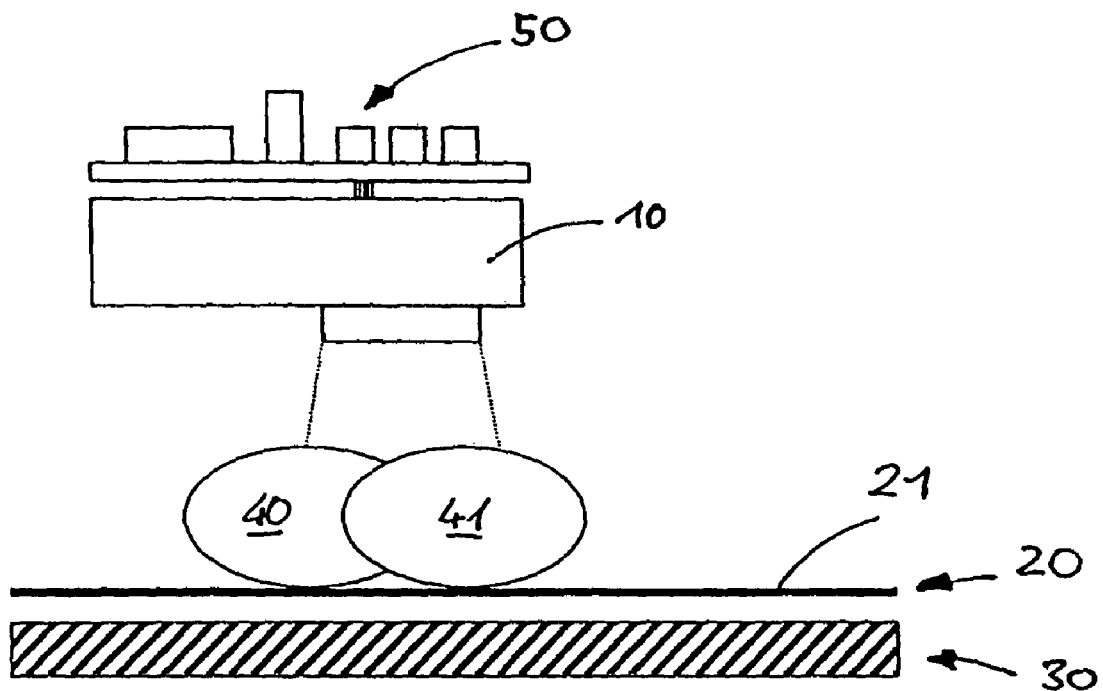
FIG. 1 shows a longitudinal cross-sectional side view of a counting device according to the invention which is arranged above a conveying device.
Figure 2:
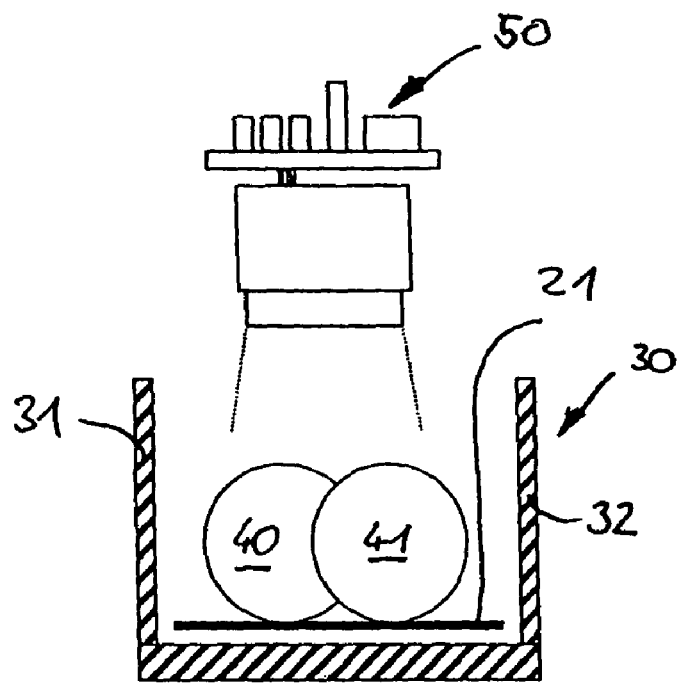
FIG. 2 shows a transverse cross-sectional front view of the arrangement according to FIG. 1.

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The embodiment according to the invention comprises a digital, multi-line CCD camera 10, which scans a detection area which extends vertically downward over a prespecified angular area.

Through the detection area of the CCD camera 10 runs an endless conveyor belt 20, and an upper conveyor belt strand 21 which is arranged in a U-shaped guiding device 30, so that two legs 31, 32 of the U-shaped guiding device prevent eggs located on the upper conveyor belt strand 21 from falling off the side of the conveyor belt strand.

The conveyor belt 20 is provided with a plurality of holes (not shown) which are dimensioned so that an egg cannot fall through the holes but can be partly held in place by such a hole and in this way is fixed relative to the conveyor belt by engagement. The conveyor belt typically has a width of ten centimeters, but conveyor belts of smaller or larger widths and differently designed conveying devices, such as for example bar conveyor belts, can be scanned by the counting device according to the invention.

The eggs 40, 41 placed on the upper conveyor belt strand 21 are conveyed through the observation chamber of the CCD camera 10 and in this way are scanned and registered line by line at high frequency. An evaluation device 50 connected to the CCD camera 10 registers the different image data values from the detection area of the CCD camera and identifies the eggs on the conveyor belt 20.

The contour, i.e., the outline of the eggs, as shown from the direction of view of the CCD camera 10, is identified by the evaluation device as soon as an egg reaches the detection area of the CCD camera. An egg recognized in this way is compared with egg profiles programmed into the evaluation device and is thus identified. After identification the egg is marked in the evaluation device as an identified egg and its movement is followed through the detection chamber. As soon as an egg has been identified in this way, the value on the counter in a memory of the evaluation device 50 is increased by one. The egg is followed and usually leaves the detection area of the CCD camera 10 on the side opposite to the side of entry. If as an exception the egg leaves the detection area on the same side that it entered said area, the value on the counter in the memory of the evaluation device is reduced by one. A reduction is also made when an egg passes through the detection in the opposite direction to the conveying direction.

The CCD camera has an integrated infrared lighting device, and the CCD sensors operate in the infrared range so that the CCD camera is independent of the lighting in the area surrounding the counting device.

The CCD camera 10 also detects the reflection pattern of the egg, i.e., the brightness intensity distribution of the egg surface, and thus can distinguish between the holes in the conveyor belt 20 and eggs laid on top of it.

The CCD camera also has a communication interface (not shown) via which it can be coupled with one or more additional CCD cameras in order to cover a wider detection area. The image data of such connected CCD cameras is evaluated by a central evaluation device. Overlapping areas are registered by the evaluation device and evaluated so that there is no double counting in these areas.

An evaluation device 50 comprises a communication interface by means of which the data detected by the CCD cameras and evaluated by the evaluation device can be output. A diagnosis program is also integrated into the evaluation device, which identifies functional faults and dirt on the optical system of the CDD camera 10 and can output a corresponding signal.

The evaluation device 50 also registers the surface of each identified egg and calculates the percentage of dirt on the total surface of the egg taking into account the surface curvature of an egg stored in the memory as a reference. If this percentage exceeds a predefined, limit a separate counter in the memory is increased.

The evaluation device 50 also compares the external contour of each identified egg with the required contours of eggs stored in the memory and in this way is able to identify a non-starter. On identifying a non-starter, a separate counter value in the memory is increased. In the same way, the evaluation device 50 can identify and count broken or incomplete eggs by outline identification and comparison with stored required outline measurements.

In the evaluation device, a reference table is also stored which contains conversion factors, which for different observation angles, shapes and sizes make it possible to calculate the volume of the egg from the identified contour. The reference table also contains conversion factors by means of which the total egg weight can be calculated from the egg volume, and thus the identified egg can be allocated into a weight class. If necessary, individual counters are provided which make it possible to count the eggs according to weight classes.

The counting device is also in a position to register the conveyor belt speed by scanning the conveyor belt and to provide a signal.

Figure 3:
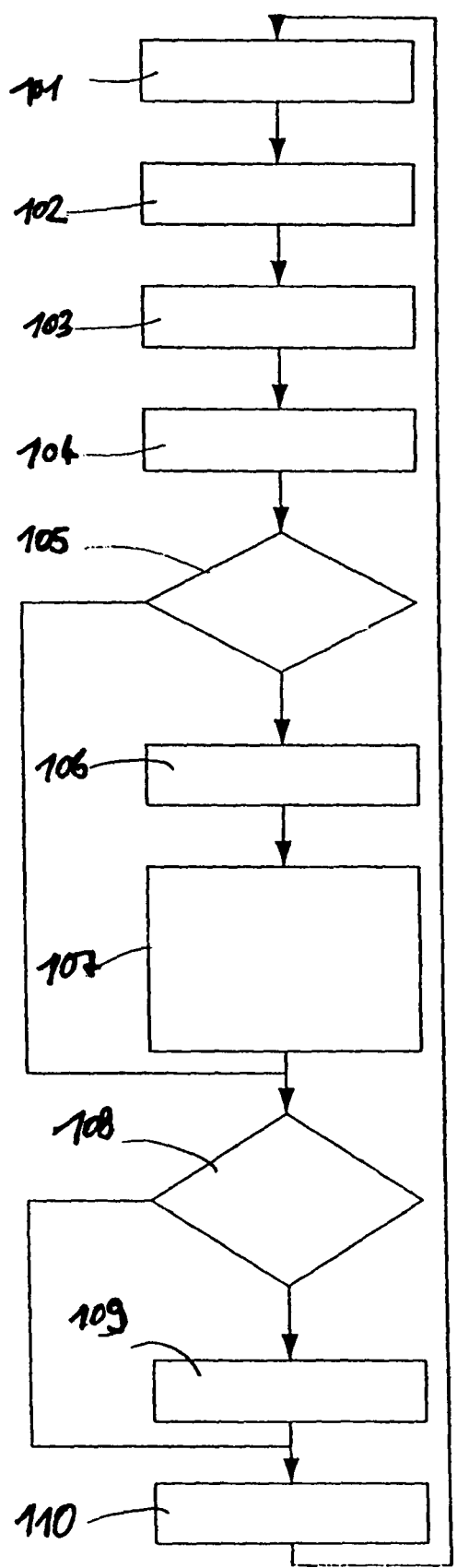
FIG. 3 shows a schematic flow chart of a counting process according to the invention.

FIG. 3 shows an example of the sequence of the counting process with the counting device according to the invention or the counting method according to the invention.

The cyclical process begins with stage 101, in which an image is recorded by a counting sensor. The recorded image is sent to an evaluation unit in which in stage 102 the contour of an object or several objects located in the area of the image is established, and in stage 103 objects are extracted from the thus determined contours. The thus extracted objects are allocated in stage 104 to make the decision 105 whether there are newly detected objects among said objects or whether already extracted objects have been identified.

Depending on this decision 105, if new objects have been found, in stage 106 a counter is increased, and in stage 107 the features relevant to the found object or newly found objects, such as soiling, size, volume and weight, are extracted, defined, calculated and sent to the statistical evaluation device. If at decision 105 no new objects have been found stages 106 and 107 are skipped over, and the method continues at the same point with decision 108.

At decision 108, it is checked whether the extracted and allocated objects have left the detection area in the opposite direction to the normal conveying direction. If this is the case, in stage 109 the counter is reduced by the number of objects which have left the area in the opposite direction to the normal conveying direction. If no object has left the area in opposite direction to the normal conveying direction, the counter remains unchanged.

The cycle ends with stage 110, in which data is sent to an evaluation or statistical unit and then recommences with stage 101.

By means of the invention, a device and a method are provided for counting objects, in particular eggs, which produce a differentiated statement with respect to available functions in relation to the production processes and any faults in the production processes and consequently provide more economical production processes. The device according to the invention is as immune as possible to any faults in the counting procedure and reports these automatically. Additional data, such as soiling or product errors, can also be recognized, counted and/or reported.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An apparatus for counting objects such as eggs and the like, comprising:
   a plurality of first detectors, each having a locally defined first detection area, being adapted to detect electromagnetic radiation, in particular light in the visible or infrared range, from the first detection area, and being arranged next to one another in a first line;
   an evaluation unit coupled to the first detectors and configured to process the signals from the first detectors and, based on the signal of each of the first detectors, establish the presence of an object in the first detection area of the first detectors;
   a plurality of second detectors, each having a locally defined second detection area, being adapted to detect electromagnetic radiation, in particular light in the visible or infrared range, from the second detection area, and being arranged next to one another in a second line disposed adjacent to and parallel with the first line; and wherein the evaluation unit is coupled to the second detectors and is configured to process the signals of the second detectors and based on the signal of each of the second detectors to establish the presence of an object in the second detection area of the second detectors;

the evaluation unit is configured to determine a direction of movement of the object relative to the first and second detectors on the one hand and whether a new article has entered one of the first and second detection areas on the other hand; and the evaluation unit comprises a counting apparatus with a counter and is configured to advance the counter by one when a new article has moved into one of the first and second detection areas of the first and second detectors in a direction of entry and has been identified, and wherein the counting apparatus is configured to set back the counter by one when an object, which has moved into one of the first and second detection areas of the first and second detectors and has been previously identified, has moved out of one of the first and second detection areas in a direction opposed to its direction of entry.

2. The apparatus according to claim 1, wherein:
a specified number of first and second detectors are arranged in a first line and a second line respectively, and an interface is present in order to couple the apparatus to another apparatus with first detectors and second detectors in such a way that the first and second lines of the two apparatus are arranged in the form of a continuation of each other.

3. The apparatus according to claim 1, wherein:
the first and second detectors are designed to detect in the infrared wave band, and at least one infrared radiation source is made available in order to illuminate the first and second detection areas.

4. The apparatus according to claim 3, wherein:
an infrared radiation source is made available for each of the first and second detectors in order to illuminate the first and second detection areas.

5. The apparatus according to claim 1, wherein:
the evaluation device is designed to evaluate simultaneously a plurality of articles detected in the first and second detection areas.

6. The apparatus according to claim 1, including:
a storage apparatus in which a plurality of previously known contours of one or more of the articles is stored, and by a comparison apparatus in order to compare the contour of an article detected by the first and second detectors with the stored contours to identify the article.

7. The apparatus according to claim 1, wherein:
at least one of the first and second detectors is designed to determine an intensity of brightness and/or a color value from a detection range.

8. The apparatus according to claim 1, wherein:
the evaluation device is designed to determine a degree of soiling a surface feature of the article, with reference to the intensity of brightness and/or the color value.

9. The apparatus according to claim 1, including:
a storage apparatus in which a plurality of previously known threshold values or distributions, of the intensity of brightness and/or the color values within the contour of the article are stored; and
a comparison apparatus to compare a local value detected by the first and second detectors or a determined value or a distribution of the intensity of brightness and/or of the color values of an article with the stored threshold value or distribution or threshold values or distributions of the intensity of brightness and/or color values to identify the article in the event of a threshold value being exceeded and/or not being reached or in the event of correspondence of the stored and detected distribution patterns.

10. The apparatus according to claim 1, including:
a self diagnosis and correction apparatus which is designed to recognize a defect in an individual one of the first and second detectors, and to cause the evaluation device not to take into consideration the measurement values of a defective one of the first and second detectors.

11. The apparatus according to claim 10, wherein:
the self-diagnosis and correction apparatus is designed to emit a warning signal in the event of a predetermined number of defective ones of the first and second detectors being exceeded.

12. The apparatus according to claim 1, wherein:
the evaluation device is designed to calculate, with reference to determined contours of an article and previously known stored reference values, the volume and/or the weight of the article and in order to display the values or to store them in a storage apparatus.

13. The apparatus according to claim 1, including:
a conveying apparatus for conveying the articles; and wherein
said counting apparatus is arranged in such a way that the same counts the articles supplied to the conveying apparatus; and including
a control device which is designed to cause the articles to be conveyed by the conveying apparatus when a predetermined quantity of the articles has been counted by the counting apparatus.

14. The apparatus according to claim 1, including:
control of eggs, comprising:
a driven endless conveyor belt for conveying eggs; and wherein
said first and second detectors are adapted to detect the contour and the distribution of the intensity of brightness and/or the color of each egg on the conveyor belt, and is arranged in such a way that it counts and analyses the eggs conveyed on the conveyor belt; and including
an interface for displaying and/or storing the number of the conveyed eggs in a plurality of previously determined weight classes.

15. A method for counting objects, such as eggs and the like, comprising the steps of:
determining electromagnetic radiation, in particular light in the visible or infrared range, from a locally defined first detection area of a plurality of first detectors which are arranged next to one another in a first line;
determining the present of an object in the first detection area of at least one of the first detectors by way of the electromagnetic radiation received from the first detection area;
determining electromagnetic radiation, in particular light in the visible or infrared range, from a locally defined second detection area of a plurality of second detectors which are arranged next to one another in a second line;
determining the presence of an object in the second detection area of at least one of the second detectors by way of the electromagnetic radiation received from the second detection area;
conveying the objects through the first and second detection areas;

arranging the first and second detectors to determine at least a portion of the contour of the objects from a location generally perpendicular to the direction of object travel, whereby two contours or sections of the contour of the objects are identified and established at staggered times, are then compared, and from the arrangement of the contour or sections of the contour and the time between the measurements, a movement direction of each object is determined relative to the detectors, and it is thereby determined whether the time-staggered contours or contour sections belong to the same object or a different object;

advancing a counter by one when a previously unidentified object moves into at least one of the first and second detection areas of the first and second detectors in a first, predetermined entry direction and is identified; and setting back the counter by one when a previously identified object, which has already been counted, moves out of one of the first and second detection areas of the first and second detectors in a second direction opposite to the first direction.

16. The method according to claim 15, including:
illuminating the first and second detection areas by one or more infrared radiation sources.

17. The method according to claim 15, including:
comparing the contour of an object detected by one of the first and second detectors with a plurality of saved, already known contours.

18. The method according to claim 15, wherein:
determining a brightness intensity and/or color value from at least one of the first and second detection areas using at least one of the first and second detectors.

19. The method according to claim 18, including:
comparing a local or averaged value detected by the first and second detectors or a distribution of the brightness intensity and/or the color value of an object with saved threshold values or distributions of the brightness intensity and/or the color values.

20. The method according to claim 18, including:
using the brightness intensity and/or the color value to detect a surface feature soiling or type of soiling of the objects.

21. The method according to claim 15, including:
detecting a fault in an individual detector, and using the signals of an adjacent detector instead of the signals of the faulty detector.

22. The method according to claim 21, including:
emitting a warning signal when a prespecified number of faulty detectors is exceeded.

23. The method according to claim 15, wherein:
using determined contours of an object by way of previously known stored reference values of the volume to calculate the volume and weight of the objects and storing the calculated values.

24. The method according to claim 15, including:
feeding the objects to a conveying device; and
conveying the objects through the conveying device when a predetermined number of objects has been counted.

25. The method according to claim 15, including:
conveying eggs on a conveyor belt;
determining the contour, the brightness intensity, and/or the color distribution of each egg and identifying the egg by way of said contour, brightness intensity, and/or color distribution;
calculating the egg weight from the detected contour of the egg;
calculating the amount of dirt on the surface of the egg from the brightness intensity and/or color distribution; and
outputting and/or storing the number in several, previously defined weight classes and/or the degree of soiling of the conveyed eggs.

* * * * *